Dec. 13, 1960     A. L. CARPENTER     2,963,815
LURE HOLDING ASSEMBLY FOR FISHERMEN'S WEARING APPAREL
Filed Oct. 13, 1958
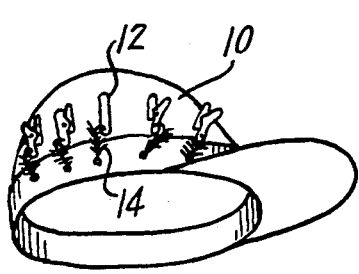
FIG.1
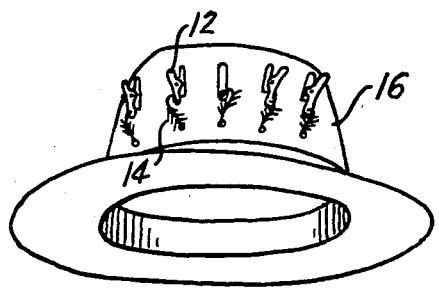
FIG.2
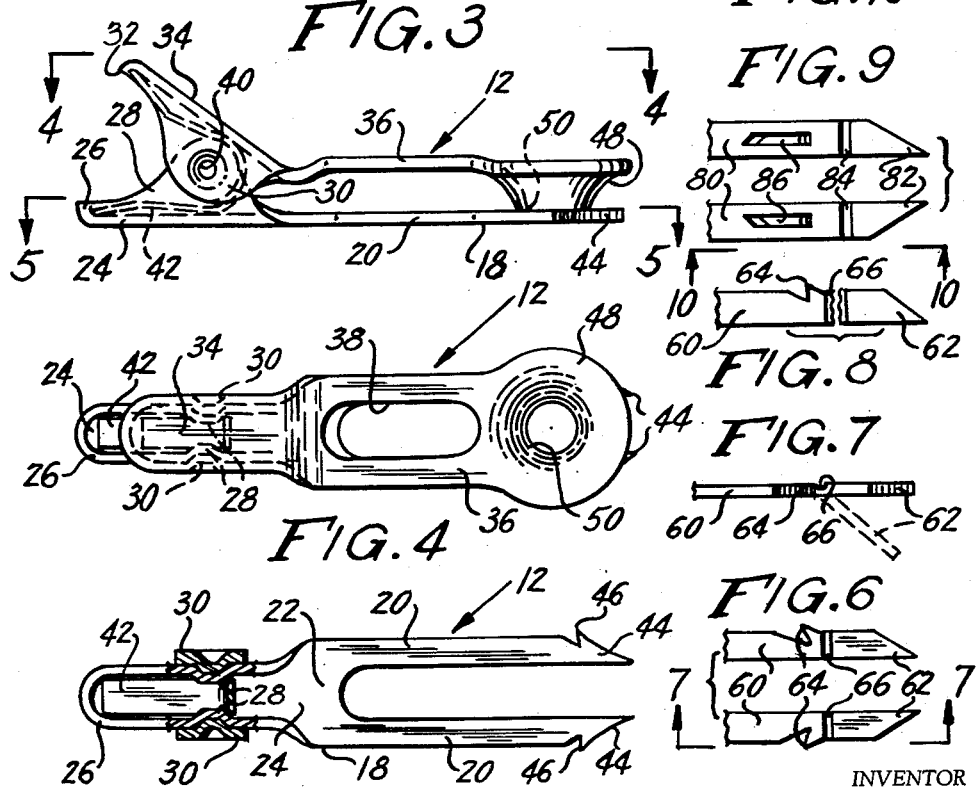
INVENTOR
ALLEN L. CARPENTER
BY Gustave Miller
ATTORNEY

United States Patent Office 2,963,815
Patented Dec. 13, 1960

2,963,815

LURE HOLDING ASSEMBLY FOR FISHERMEN'S WEARING APPAREL

Allen L. Carpenter, 9144 Eastex Freeway, Exit 3, Houston 16, Tex.

Filed Oct. 13, 1958, Ser. No. 766,956

8 Claims. (Cl. 43—57.5)

This invention relates to holding means for fishing flies or the like, and it particularly relates to a holding means of the above type which is adapted to be attached to a hat, cap or the like.

Many different attempts have previously been made to provide means for holding small fishing flies or other lures in a secure and accessible position during fishing and prior to use. It has also been found that the fisherman's hat or cap is a very accessible and desirable place upon which to carry the bait. However, although various types of hat anchoring means for such flies or lures were produced, none proved completely adequate for the purpose since they either tended to slip off the hat or had to be so securely attached that they could not be easily removed when desired.

It is one object of the present invention to overcome the above difficulties by providing a fly or lure holding means for attachment to headgear which is securely attachable to the headgear while yet being easily removed therefrom.

With the above and related objects in view, this invention consists in the details of construction and combination of parts, as will be more fully understood from the following description, when read in conjunction with the accompanying drawing in which:

Fig. 1 is a perspective view of a cap to which a holding device embodying the present invention has been applied.

Fig. 2 is a perspective view of a hat to which the holding means embodying the present invention has been applied.

Fig. 3 is a side elevational view of the holding device used on the headgear of Figs. 1 and 2.

Fig. 4 is a top plan view taken on line 4—4 of Fig. 3.

Fig. 5 is a sectional view taken on line 5—5 of Fig. 3.

Fig. 6 is a fragmentary plan view of a modified form of the invention.

Fig. 7 is a side elevational view taken on line 7—7 of Fig. 6.

Fig. 8 is a top plan view of one of the prongs of the device of Fig. 6, showing the pointed end being broken off.

Fig. 9 is a top plan view of a third modification of the invention.

Fig. 10 is a side elevational view taken on line 10—10 of Fig. 9.

Referring in greater detail to the drawing wherein similar reference characters refer to similar parts, there is shown in Fig. 1, a cap 10 to which fly or lure holding means 12 carrying dry flies 14 have been attached. The same type fly or lure holding means 12 and fly or lure 14 are shown attached to the crown of hat 16 shown in Fig. 2.

One fly or lure holding device 12 is illustrated in greater detail in Figs. 3 to 5. This device 12 comprises a fork member 18 having a pair of fork tines 20 extending from a bridge portion 22. The bridge portion 22 is integral with a stem 24 the sides of which are upturned to form a peripheral flange 26. The flange 26 tapers upwardly on each side of the stem 24 to form a pair of oppositely disposed ears 28.

The ears 28 are indented at their central portions and are encompassed by a pair of ears 30 depending from a peripheral flange 32 around a stem 34 which is integral with a plate 36 having a central aperture 38 therein. The ears 28 and 30 are pivotally connected by detents or the like shown at 40. A leaf spring 42 is positioned, in bowed condition, between the inner surfaces of the stems 24 and 34 whereby the spring 42 biases the stems away from each other and the opposite ends of the fork 18 and plate 36 toward each other.

At the opposite end of the fork 18 from the stem 24, the tines 20 are each provided with an inwardly-tapered cutting edge forming a prong 44. The prongs 44 are each positioned adjacent a lateral barb 46 formed by indenting the tine 20 with a V-shaped notch.

At the opposite end of the plate 36 from the stem 34, the plate 36 is provided with a generally cup-shaped pocket 48 having a central hole 50 therein. This hole 50 is centered between the tines 20 when the device is in its normally compressed position under the influence of spring 42. This hole 50 is adapted to receive the hook portion of the fly or lure such as the dry flies shown at 14.

In use, the holders 12 are attached to the headgear 10 or 16 by pinching together the two stems 24 and 34 to open the device and then, while keeping it open, piercing the fabric of the headgear with the prongs 44 and inserting the tines 20. The holders 20 are then in position to hold the fly or lure. This is done by pulling the plate 36 away from the tines 20, inserting the hook portion of the fly or lure into and partly through the hole 50 in cup member 48 and then releasing the device permitting it to snap shut and clamp the partly extending hook portion between the edges of hole 50 and the fabric of the headgear against the tines 20. The removal of the fly or lure is effected in the reverse manner. The barbs 46 act to anchor the tines 20 in the fabric at all times.

In Figs. 6, 7 and 8 there is shown a modified form of the invention wherein the tines 60 are similar to tines 20 in that they are provided with inwardly-extending tapered cutting edges defining prongs 62 and are also provided with lateral barbs 64. However, the barbs 64 are spaced farther away from their respective prongs 62 and between the barbs 64 and the prongs 62, but adjacent the barbs 64, there are provided grooves 66 which extend across the widths of each tine. These grooves 66 form lines of weakness which permit the prongs 62 to be broken away after the device has been inserted and secured in place. By breaking off these prongs 62, any inadvertant or accidental cuts or scratches on the head of the wearer are prevented; however, the weakening of the prong does not permit as great a force to be used during insertion and also makes the device more amenable to breakage during handling.

In Figs. 9 and 10 there is illustrated yet another form of the invention wherein the tines 80 are similar to tines 60 in that they are provided with prongs 82 rearwardly of which are provided weakening grooves 84. However, instead of lateral barbs such as 64, there are provided downwardly depending barbs 86 which are struck out or stamped out from the body of each tine 80. This construction is somewhat less expensive than others since it is not necessary to cast or machine the barb during formation of the device; on the contrary, all that is necessary is to take the required slits or perforations during formation of the tines 80 and then press out the barbs when desired. This type of construction, although somewhat cheaper than the others, is also somewhat less sturdy since the barbs 86 may be more easily broken off.

Although Figs. 9 and 10 show a construction including lines of weakness at 84, this form of the invention can also be used without such grooved lines of weakness, as for example with such tines as shown in Fig. 5.

The prongs 44, 62 and 82 have all been disclosed as being constructed of flat strip or plate metal or the like of any desired cross-sectional shape.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A fly or lure holding assembly for attachment to the fabric of a fisherman's wearing apparel comprising a forked member and a plate member pivotally secured to each other, said members each having a stem extending in one direction from their pivotal connection and means resiliently biasing said stems away from each other, said forked member having a pair of tines extending in the opposite direction from said pivotal connection, and said plate member having a fly or lure holding means also extending in said opposite direction, said tines each having a retaining barb extending therefrom and a fabric penetrating prong portion at their free ends, said holding means comprising an edge defining a hole in said plate member, whereby the fly or lure is held extending through the hole against the penetrated fabric, said holder being located centrally of a conical protuberance extending from said plate member toward said tines.

2. The fly or lure holding assembly of claim 1 wherein said barbs extend laterally of their respective tines.

3. The fly or lure holding assembly of claim 1 wherein said barbs are stamped out from their respective tines and extend downwardly from one face of their respective tines.

4. The fly or lure holding assembly of claim 1 wherein a line of weakness is provided on each tine between the prong portion and the barb.

5. A fly or lure holding assembly for attachment to the fabric of a fisherman's wearing apparel comprising a forked member having a pair of tines at one end and a handle portion at the opposite end, a fly or lure holding member having a hook holding means at one end and a handle portion at the opposite end, a pair of spaced ears extending out from each member, the ears of one member being pivotally connected to the ears of the other member, said ears being positioned between the handle portions and the remaining portions of their respective members, a spring biasing said handle portions away from each other, a fabric penetrating prong at the free end of each of said tines, and a retaining barb integrally provided on each tine, said holding means comprising an edge defining a hole in said plate member, whereby the fly or lure is held extending through the hole against the penetrated fabric, said holder being located centrally of a conical protuberance extending from said plate member toward said tines.

6. The fly or lure holding assembly of claim 5 wherein a line of weakness separates the prong from the barb on each tine.

7. The fly or lure holding assembly of claim 5 wherein said barbs extend laterally of their respective tines.

8. The fly or lure holding assembly of claim 5 wherein said barbs depend from one surface of their respective tines.

References Cited in the file of this patent

UNITED STATES PATENTS

| | | |
|---|---|---|
| 1,297,344 | Glass | Mar. 18, 1919 |
| 2,400,488 | Cochran | May 21, 1946 |
| 2,629,965 | Chew | Mar. 3, 1953 |